US011164051B2

(12) United States Patent
Deegan

(10) Patent No.: US 11,164,051 B2
(45) Date of Patent: Nov. 2, 2021

(54) IMAGE AND LIDAR SEGMENTATION FOR LIDAR-CAMERA CALIBRATION

(71) Applicant: GM Cruise Holdings LLC, San Francisco, CA (US)

(72) Inventor: Thomas Deegan, San Francisco, CA (US)

(73) Assignee: GM Cruise Holdings, LLC, San Francisco, CA (US)

( * ) Notice: Subject to any disclaimer, the term of this patent is extended or adjusted under 35 U.S.C. 154(b) by 0 days.

(21) Appl. No.: 16/814,639

(22) Filed: Mar. 10, 2020

(65) Prior Publication Data

US 2021/0287035 A1    Sep. 16, 2021

(51) Int. Cl.
*G06K 9/62* (2006.01)
*G06T 7/521* (2017.01)
*G01S 17/89* (2020.01)

(52) U.S. Cl.
CPC .............. *G06K 9/628* (2013.01); *G01S 17/89* (2013.01); *G06K 9/6202* (2013.01); *G06T 7/521* (2017.01); *G06T 2207/10028* (2013.01); *G06T 2207/30252* (2013.01)

(58) Field of Classification Search
CPC ...... G06K 9/628; G06K 9/6202; G06T 7/521; G06T 2207/30252; G06T 2207/10028; G01S 17/89
See application file for complete search history.

(56) References Cited

U.S. PATENT DOCUMENTS

| 10,002,412 | B2* | 6/2018 | Park | G06T 5/003 |
| 10,692,192 | B2* | 6/2020 | Denny | G06T 5/003 |
| 2020/0018852 | A1* | 1/2020 | Walls | G06K 9/00791 |
| 2020/0018854 | A1* | 1/2020 | Hicks | G01S 7/4802 |

OTHER PUBLICATIONS

ProQuest Search History Attached (Year: 2021).*

* cited by examiner

*Primary Examiner* — Nancy Bitar
(74) *Attorney, Agent, or Firm* — Polsinelli, PC

(57) ABSTRACT

The subject disclosure relates to techniques for selecting points of an image for processing with LiDAR data. A process of the disclosed technology can include steps receiving an image data comprising an image object comprised of a plurality of image pixels, calculating a number of image pixels corresponding with the image object, receiving Light Detection and Ranging (LiDAR) point cloud data comprising a plurality of LiDAR data points corresponding with the image data collected from the camera sensor, and calculating a number of LiDAR data points corresponding with the image object. Systems and machine-readable media are also provided.

17 Claims, 6 Drawing Sheets

IMAGE AND LIDAR SEGMENTATION FOR LIDAR-CAMERA CALIBRATION

BACKGROUND

1. Technical Field

The subject technology provides solutions for identifying inaccurate calibration of camera and Light Detection and Ranging (LiDAR) sensors and in particular for using machine-learning models to compare object classifications of select image pixels and corresponding LiDAR points.

2. Introduction

Image processing systems that are configured to perform object recognition often use bounding boxes to identify image regions corresponding with locations of objects of interest. In some applications, objects need to be transformed into three-dimensional (3D) space. Conventional cameras and Light Detection and Ranging (LiDAR) sensors may result in misalignment or calibration errors that generate misaligned and inaccurate data. Since autonomous vehicles rely heavily on highly accurate data, the misalignment or calibration errors create a need for identifying inaccurate data.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
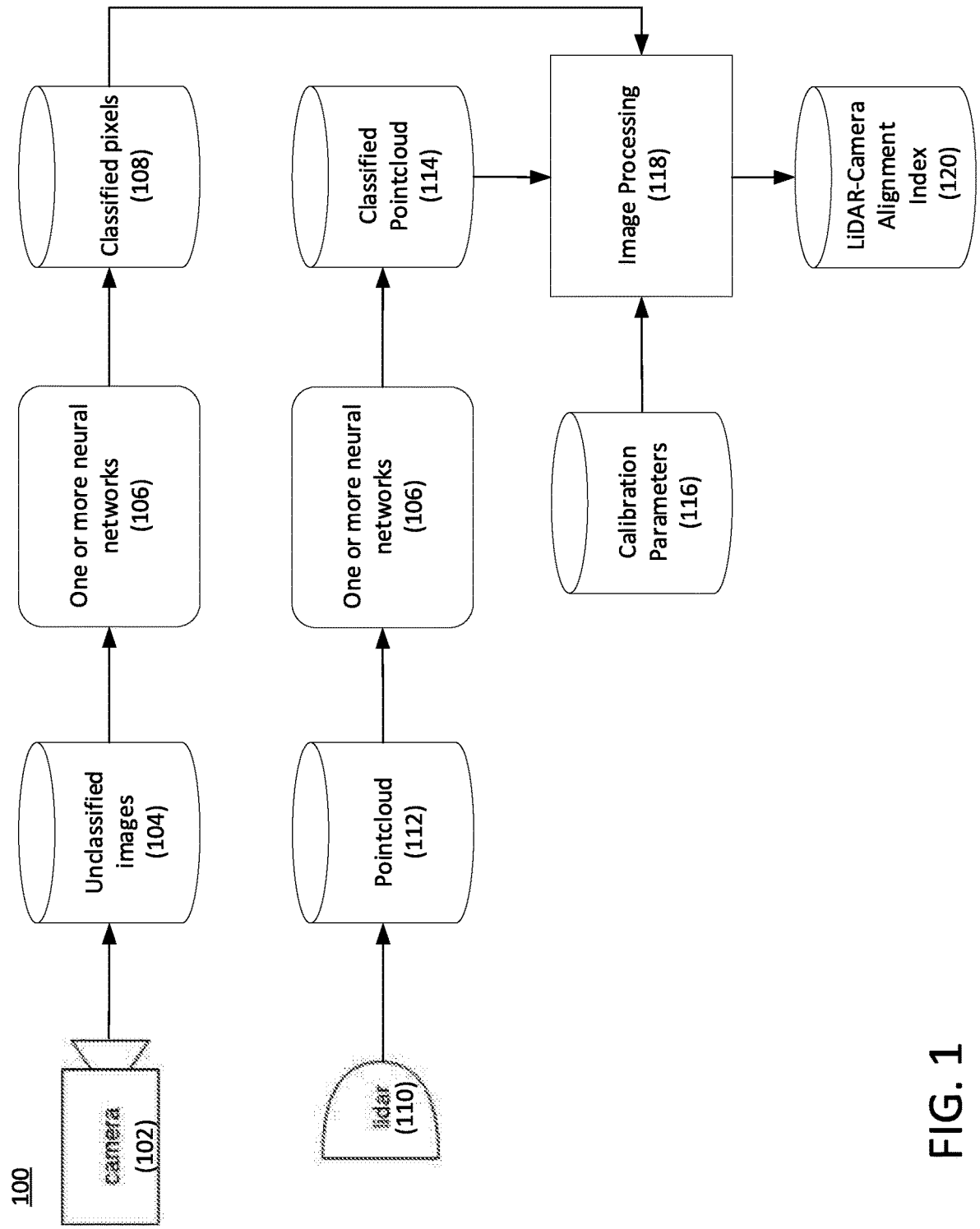
FIG. 1 illustrates an example system that can be used to identify calibration errors between cameras and Light Detection and Ranging (LiDAR) sensors, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Due to the heavy reliance of autonomous vehicles on highly accurate data sets, there is a need for identifying inaccurate data. For example, autonomous vehicles rely heavily on thousands of images received from onboard cameras or sensors every minute to navigate on roadways. Each of these images capture many objects, such as pedestrians, other vehicles, sidewalks, road signs, etc. Furthermore, cameras capture all of these objects in two-dimensional (2D) space as images. Although some technologies may facilitate distance estimations of objects in images, these technologies are only useful in processing the images with corresponding Light Detection and Ranging (LiDAR) data when the camera and the LiDAR sensor capturing the corresponding LiDAR data is well calibrated. Accordingly, is a need to identify misalignment or inaccurate calibration between cameras and LiDAR sensors.

Aspects of the disclosed technology address the limitations of identifying misalignment or inaccurate calibration between cameras and LiDAR sensors. More specifically, one or more neural networks are trained to identify objects in images and place bounding boxes around the objects. The one or more neural networks also are trained to classify points in LiDAR data and generate a classified pointcloud. The one or more neural networks may then combine the bounding boxes and calibration settings to generate or output an alignment index of the camera and the LiDAR sensor. In some instances, the one or more neural networks may also determine an average of alignment between the camera and the LiDAR sensor based on the alignment index. In some instances, the one or more neural networks may then determine, based on the average of alignment, whether the camera and the LiDAR sensor are calibrated and/or aligned correctly.

As understood by those of skill in the art, machine-learning based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, general adversarial networks (GANs), support vector machines, image registration methods, and/or applicable rule-based systems. Where regression algorithms are used, they can include but are not limited to: a Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

FIG. 1 illustrates an example system 100 that can be used to identify misalignment or inaccurate calibration between cameras and LiDAR sensors, according to some aspects of the disclosed technology. System 100 includes one or more cameras 102 that capture and store unprocessed (unbounded) images into a repository of unclassified images 104 from which the unprocessed (unbounded) images are provided to one or more neural networks 106. Similarly, the system 100 also includes one or more Light Detection and Ranging (LiDAR) sensors 110 that capture LiDAR data stored in a pointcloud 112. When the camera 102 and the LiDAR sensor are correctly calibrated and aligned, the LiDAR data corresponds to the images captured by the camera 102. For example, the system 100 may be an autonomous vehicle, such that the camera sensor and the LiDAR sensor is mounted to the autonomous vehicle.

The one or more neural networks 106 can be configured to identify one or more image objects in the unprocessed images. The one or more neural network 106 can then place bounding boxes around the one or more image objects, and output the bounded image objects to a repository of bounded image objects 108. For example, an image may include a first vehicle and a second vehicle; thus, the one or more neural network 106 will bound the first vehicle with a first bounding box and the second vehicle with a second bounding box.

The one or more neural networks 106 can be configured to identify one or more objects in the pointclouds. The one or more neural network 106 can then classify the objects and output the a classified pointcloud 114. For example, an image may include a first vehicle and a second vehicle; thus, the one or more neural network 106 will classify the first vehicle as a vehicle and the second vehicle as a vehicle.

The one or more neural networks 106 can also be configured to receive and process the bounded image with classified and/or bounded image objects, the classified pointcloud, and calibration parameters stored in a calibration parameters repository 116 to generate a LiDAR-camera alignment index 118. The LiDAR-camera alignment index 118 can be used to determine whether the LiDAR and camera are properly calibrated and aligned when quantified and compared to a threshold level of alignment. For example, In some instances, the LiDAR data may also be used to classify distances of the objects into distance classifications, such that the alignment index of the objects in a given distance classification may be used to determine an average alignment value for the distance classification. In these instances, the average alignment value for each distance classification may then be averaged with other distance classifications to determine a total average alignment value for the image. Similarly, each distance classification may be weighted differently to correct against biases, such as closer objects occupying a larger number of pixels in the image.

Examples of the foregoing embodiments are discussed in relation to graphical examples provided by FIGS. 2-5, discussed below.

Figure 2A:
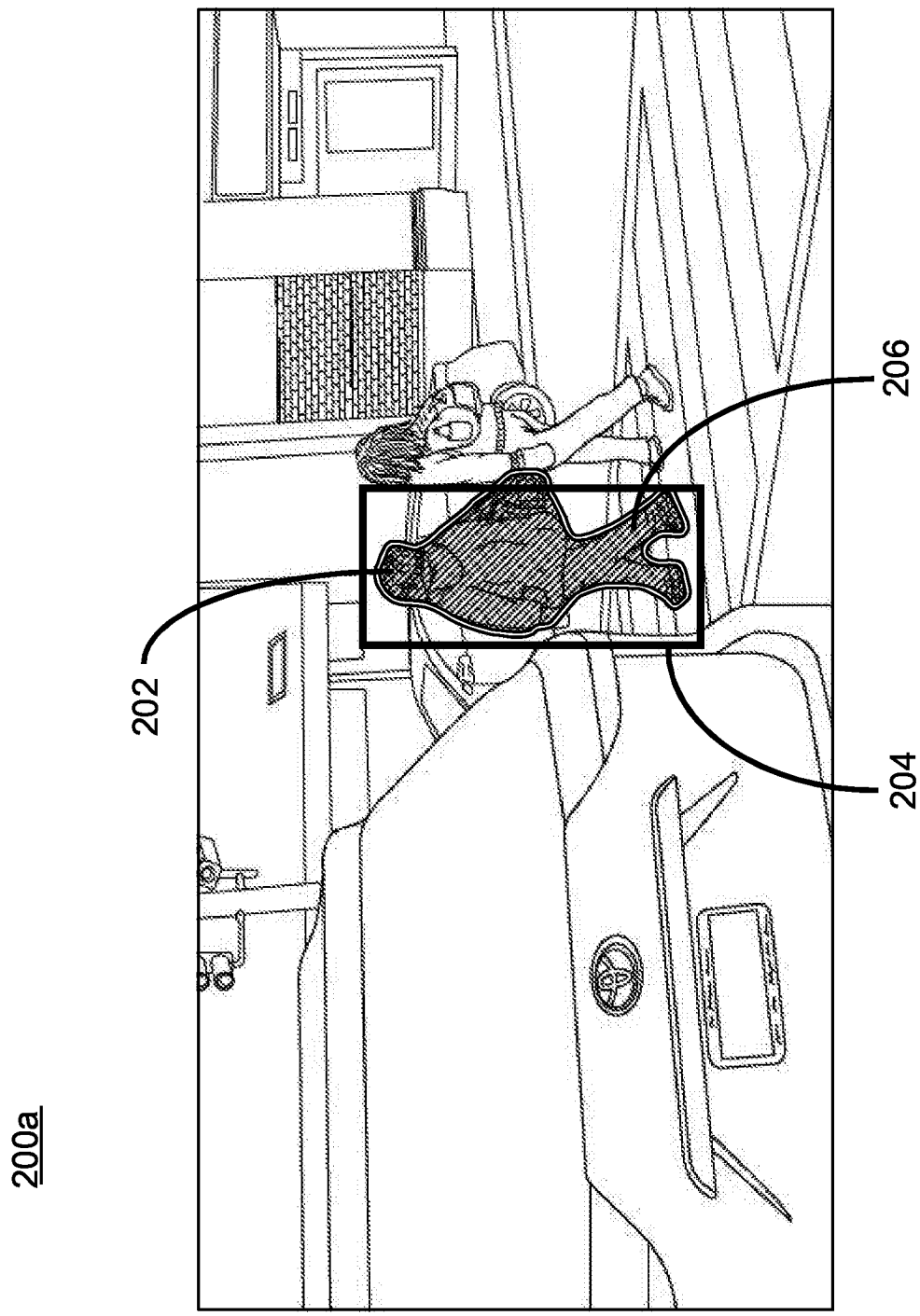
FIGS. 2A-2B illustrates an example of an image processed to include a bounding box and LiDAR data about image objects in the image, according to some aspects of the disclosed technology.
Figure 2B:
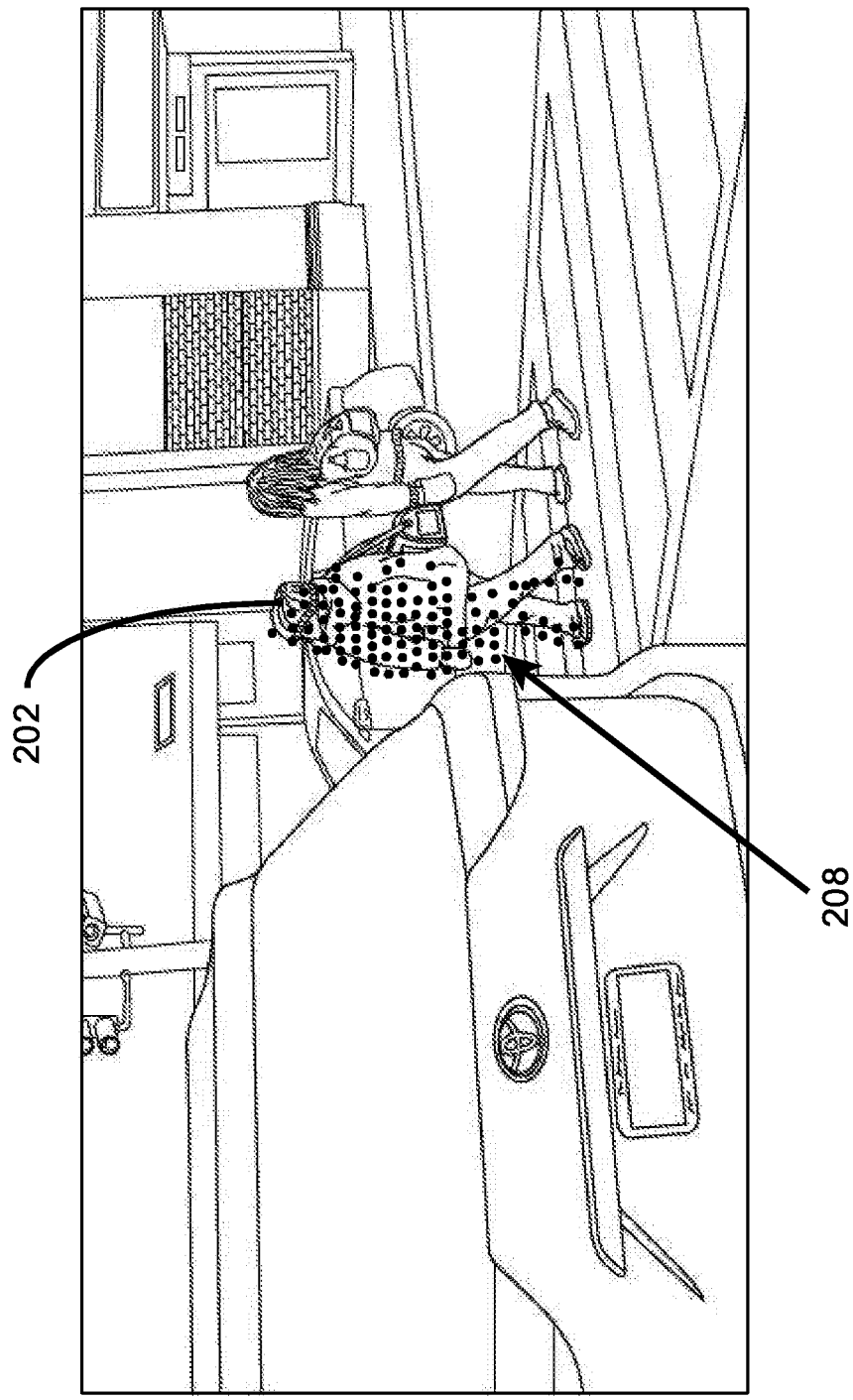

FIG. 2 illustrates an image object 202 and placement of a bounding box 204 and a classified pointcloud 206 of the image object therearound. In the example of FIG. 2, image 200 can represent an output of a bounding box process and a pointcloud classification process performed by one or more neural networks. The one or more neural networks are configured to detect one or more image objects, such as vehicles, people, signs, etc. In this example, the image object 202 is a vehicle. As shown, the one or more neural networks insert into image 200 the bounding box 204 encompassing a pixel area of the image object 202 and a classified pointcloud 206 associated with an image area of the image object 202. It is understood that a similar bounding box and pointcloud classification processing methodology can be applied to one or more other image objects in the same image set.

Figure 3:
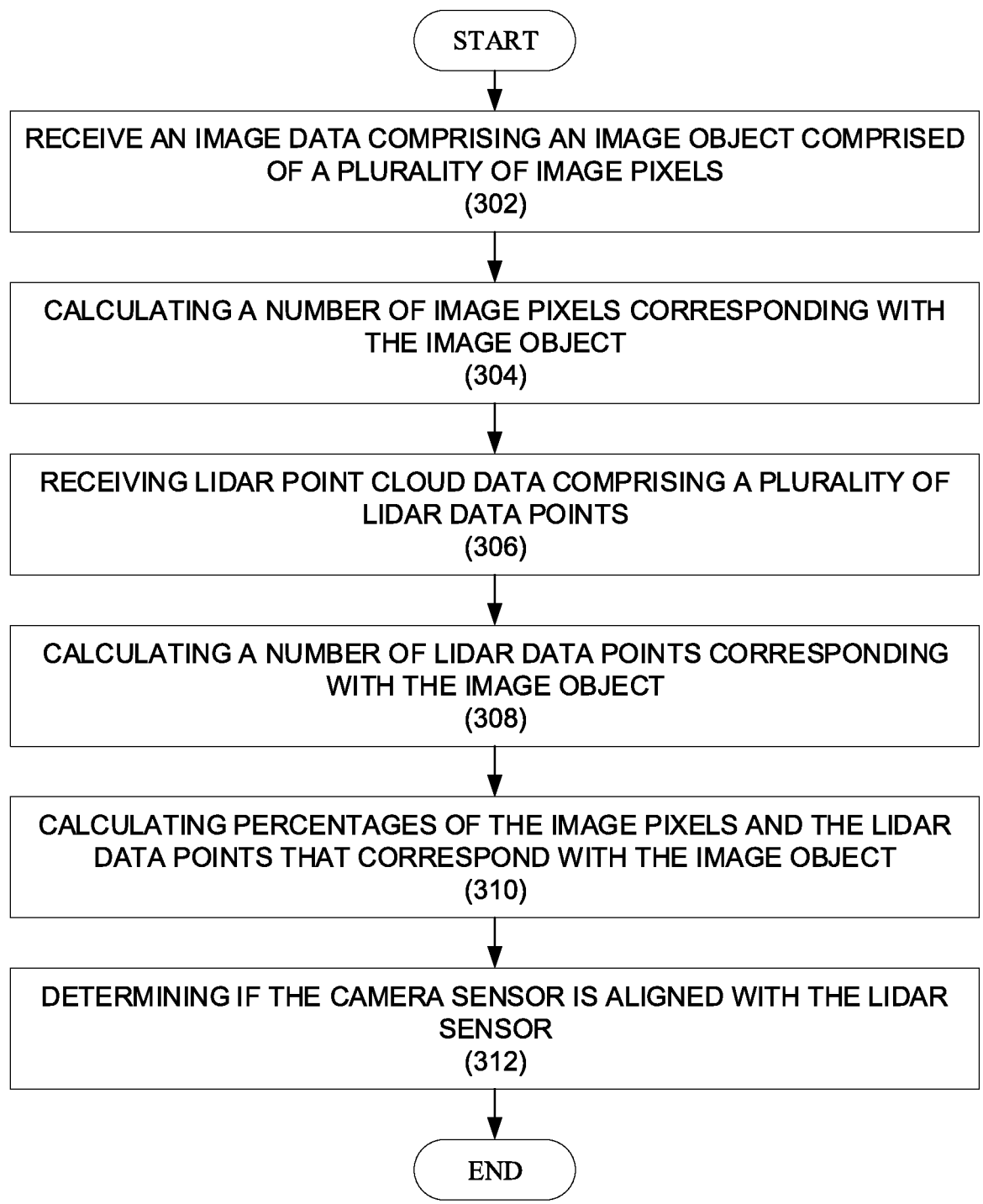
FIG. 3 illustrates steps of an example process for identifying calibration errors between cameras and LiDAR sensors, according to some aspects of the disclosed technology.

FIG. 3 illustrates steps of an example process 300 for point selection for processing with LiDAR data, according to some aspects of the disclosed technology. Process 300 begins with step 302 in which image data is received. More specifically, the image data is received from one or more cameras that records the image data. As stated above, the image data may be received from an image repository or database. In some instances, the image data may be recorded and collected in real-time, such as when the camera is mounted on an autonomous vehicle. In some instances, the image may be received from a machine-learning model that has processed the image. In other instances, as discussed above, the image may be an unprocessed image that contains one or more unbounded image objects. The image data comprises at least an image object comprised of a plurality of image pixels. For example, the image data may have a vehicle comprising an area of image pixels in the shape of the vehicle. The plurality of image pixels that accurately match the image data is considered to correspond with the image data.

In step 304, a number of image pixels corresponding with the image object is calculated. When multiple image objects are detected or identified, a number of image pixels is calculated for each of the image objects. The image pixels of each image object are also classified, and a bounding box is placed around the image object. In some instances, the image is processed through one or more neural networks, such that processing the image to place the bounding box around the first image object is performed using a first machine-learning model.

In step 306, LiDAR point cloud data collected from a LiDAR sensor is received. As stated above, the LiDAR point cloud data may be stored and received from a pointcloud 112 or a LiDAR database. In some instances, the LiDAR point cloud data may be recorded and collected in real-time, such as when the LiDAR sensor is mounted on an autonomous vehicle. The point cloud data comprises a plurality of LiDAR data points corresponding with the image data collected from the camera sensor. The plurality of LiDAR data points that accurately match the image data is considered to correspond with the image data.

In step 308, a number of LiDAR data points corresponding with the image object is calculated. When multiple image objects are detected or identified, a number of LiDAR points is calculated for each of the image objects. Furthermore, the LiDAR data points may be classified or labeled to identify what image objects the LiDAR data point is associated with. In some instances, the image is processed through one or more neural networks, such that processing the image to associate the LiDAR data points with image objects is performed using a second machine-learning model.

In step 310, a percentage of the plurality of image pixels that correspond with the image object and a percentage of the LiDAR data points that correspond with the image object are calculated. In some instances, the image may be segmented to isolate the image object, such that the percentages may have a larger discrepancy when the camera or the LiDAR sensor is misaligned. For example, the percentage of the plurality of image pixels that correspond with the image object may be one hundred percent, while the percentage of the LiDAR data points that correspond with the image object is only at eighty percent. In other words, twenty percent of the LiDAR data points that is associated with the image object may land outside of the pixel region of the image object.

In step 312, misalignment or calibration errors may be determined based on the percentages. Continuing the above example, in which the percentages were one hundred percent and eighty percent respectively, the discrepancy between the percentages may indicate that the LiDAR sensor is misaligned temporally since the LiDAR sensor is capturing a majority, but not an exact entirety of the image object. When the discrepancy between the two percentages exceed a threshold amount, there is likely to be a calibration error or a misalignment between the camera and the LiDAR sensor.

In some instances, misalignment or calibration errors may be determined based on the number of image pixels corresponding with the image object and the number of LiDAR data points corresponding with the image object. For example, the LiDAR sensor may be configured to record data points for each corresponding pixel in the image data. Thus, the number of image pixels corresponding with the image object should match the number of LiDAR data points corresponding with the image object if the camera and LiDAR sensors are accurately calibrated and aligned. Accordingly, when the discrepancy between the numbers exceed a threshold value, there is likely to be a calibration error or a misalignment between the camera and the LiDAR sensor.

In considering types of calibration or alignment errors, there are at least three. First, there are intrinsic calibration errors, which may include distortion parameters of lens of the camera or LiDAR sensors. For example, the camera may have been in direct sunlight for an extended period of time, causing the camera lens to warp. Second, there may be extrinsic calibration errors, which may include placement of the camera or LiDAR sensors. For example, the camera may be physically placed or positioned on a vehicle slightly offset from the LiDAR sensors without proper calibration parameters to account for the offset. Third, there may be a temporal issue as described above. For example, the camera may take an image a few milliseconds prior to the LiDAR sensor records LiDAR data.

In some instances, the type of discrepancies may facilitate determining the type of calibration or alignment error that exists between the camera and the LiDAR. In addressing the first error, the image pixels corresponding with the image object may take a first shape, while the LiDAR data points corresponding with the image object may take a second shape. When the first shape and the second shape are different, there is likely to be an intrinsic calibration error. In addressing the second error, the image data may have a first image object that is determined to be stationary and a second object that is determined to be moving. If the camera and the LiDAR sensor determine that both the first image object and the second image object are not in the same location vertically, then there is likely to be an extrinsic calibration or alignment error. In addressing the third error, again the image data may have a first image object that is determined to be stationary and a second object that is determined to be moving. If the stationary object remains in alignment but the second object that is in motion is misaligned, then there is likely to be a temporal calibration issue.

It is further contemplated that the image data and the LiDAR data points may then be removed from data sets that the image data and/or LiDAR data points may have been added to. The removal would result in more robust and accurate data sets to develop and further train machine-learning algorithms. Furthermore, the identification of the type of error provides users to begin fixing the type of error to reduce future occurrences of the type of error.

Figure 4:
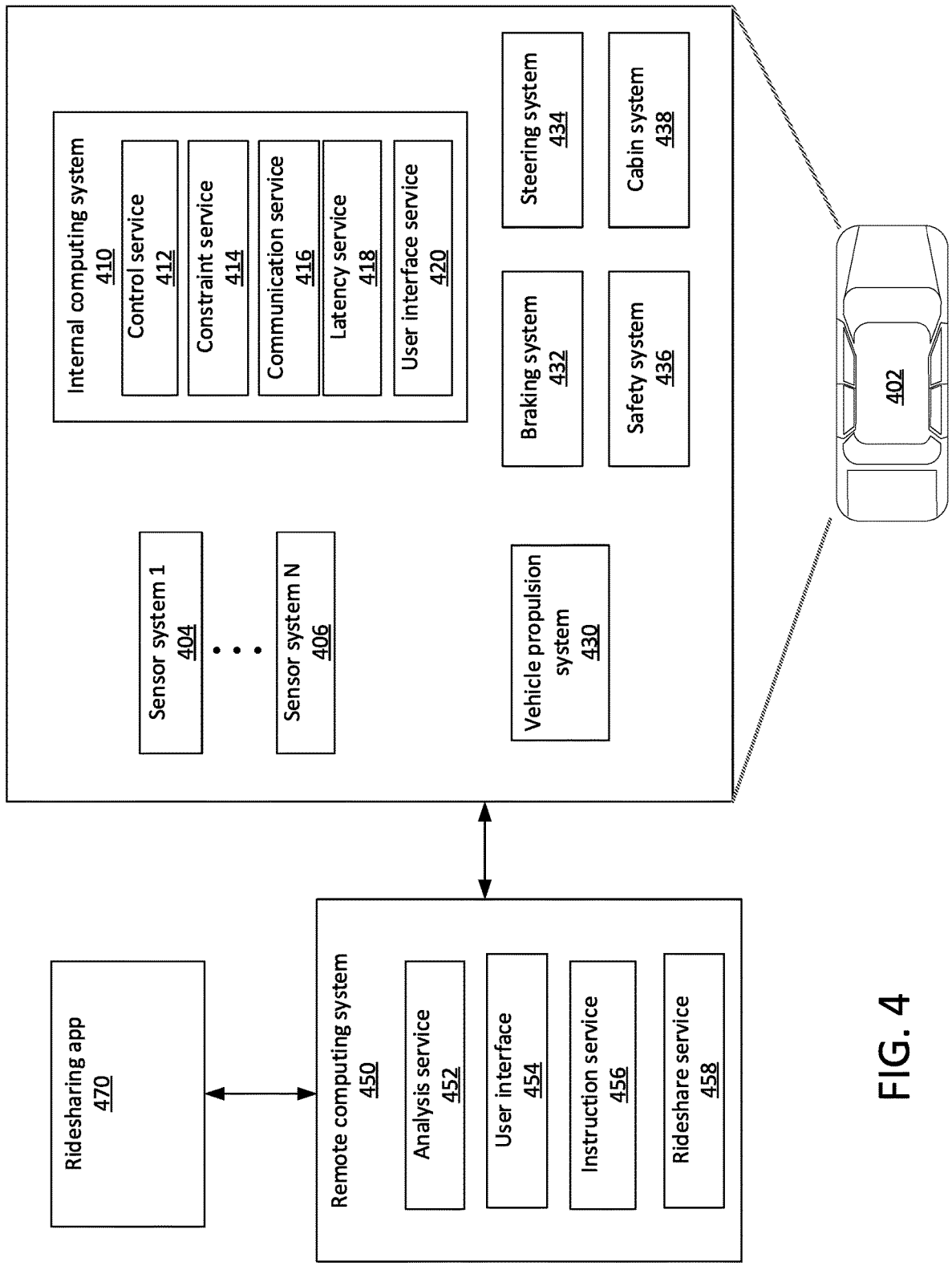
FIG. 4 illustrates an example environment that includes an autonomous vehicle in communication with a remote computing system, according to some aspects of the disclosed technology.

FIG. 4 illustrates environment 400 that includes an autonomous vehicle 402 in communication with a remote computing system 450.

The autonomous vehicle 402 can navigate about roadways without a human driver based upon sensor signals output by sensor systems 404-406 of the autonomous vehicle 402. The autonomous vehicle 402 includes a plurality of sensor systems 404-406 (a first sensor system 404 through an Nth sensor system 406). The sensor systems 404-406 are of different types and are arranged about the autonomous vehicle 402. For example, the first sensor system 404 may be a camera sensor system, and the Nth sensor system 406 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 402 further includes several mechanical systems that are used to effectuate appropriate motion of the autonomous vehicle 402. For instance, the mechanical systems can include but are not limited to, a vehicle propulsion system 430, a braking system 432, and a steering system 434. The vehicle propulsion system 430 may include an electric motor, an internal combustion engine, or both. The braking system 432 can include an engine brake, brake pads, actuators, and/or any other suitable componentry that is configured to assist in decelerating the autonomous vehicle 402. The steering system 434 includes suitable componentry that is configured to control the direction of movement of the autonomous vehicle 402 during navigation.

The autonomous vehicle 402 further includes a safety system 436 that can include various lights and signal indicators, parking brake, airbags, etc. The autonomous vehicle 402 further includes a cabin system 438 that can include cabin temperature control systems, in-cabin entertainment systems, etc.

The autonomous vehicle 402 additionally comprises an internal computing system 410 that is in communication with the sensor systems 404-406 and the systems 430, 432, 434, 436, and 438. The internal computing system includes at least one processor and at least one memory having computer-executable instructions that are executed by the processor. The computer-executable instructions can make up one or more services responsible for controlling the autonomous vehicle 402, communicating with remote computing system 450, receiving inputs from passengers or human co-pilots, logging metrics regarding data collected by sensor systems 404-406 and human co-pilots, etc.

The internal computing system 410 can include a control service 412 that is configured to control the operation of the vehicle propulsion system 430, the braking system 432, the steering system 434, the safety system 436, and the cabin system 438. The control service 412 receives sensor signals from the sensor systems 404-406 as well communicates with other services of the internal computing system 410 to effectuate operation of the autonomous vehicle 402. In some embodiments, control service 412 may carry out operations in concert one or more other systems of autonomous vehicle 402.

The internal computing system 410 can also include a constraint service 414 to facilitate safe propulsion of the autonomous vehicle 402. The constraint service 414 includes instructions for activating a constraint based on a rule-based restriction upon operation of the autonomous vehicle 402. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 412.

The internal computing system 410 can also include a communication service 416. The communication service can include both software and hardware elements for transmitting and receiving signals from/to the remote computing system 450. The communication service 416 is configured to transmit information wirelessly over a network, for example, through an antenna array that provides personal cellular (long-term evolution (LTE), 3G, 5G, etc.) communication.

In some embodiments, one or more services of the internal computing system 410 are configured to send and receive communications to remote computing system 450 for such reasons as reporting data for training and evaluating machine learning algorithms, requesting assistance from remoting computing system or a human operator via remote computing system 450, software service updates, ridesharing pickup and drop off instructions etc.

The internal computing system 410 can also include a latency service 418. The latency service 418 can utilize timestamps on communications to and from the remote computing system 450 to determine if a communication has been received from the remote computing system 450 in time to be useful. For example, when a service of the internal computing system 410 requests feedback from remote computing system 450 on a time-sensitive process, the latency service 418 can determine if a response was timely received from remote computing system 450 as information can quickly become too stale to be actionable. When the latency service 418 determines that a response has not been received within a threshold, the latency service 418 can enable other systems of autonomous vehicle 402 or a passenger to make necessary decisions or to provide the needed feedback.

The internal computing system 410 can also include a user interface service 420 that can communicate with cabin system 438 in order to provide information or receive information to a human co-pilot or human passenger. In some embodiments, a human co-pilot or human passenger may be required to evaluate and override a constraint from constraint service 414, or the human co-pilot or human passenger may wish to provide an instruction to the autonomous vehicle 402 regarding destinations, requested routes, or other requested operations.

As described above, the remote computing system 450 is configured to send/receive a signal from the autonomous vehicle 402 regarding reporting data for training and evaluating machine learning algorithms, requesting assistance from remote computing system 450 or a human operator via the remote computing system 450, software service updates, rideshare pickup and drop off instructions, etc.

The remote computing system 450 includes an analysis service 452 that is configured to receive data from autonomous vehicle 402 and analyze the data to train or evaluate machine learning algorithms for operating the autonomous vehicle 402. The analysis service 452 can also perform analysis pertaining to data associated with one or more errors or constraints reported by autonomous vehicle 402.

The remote computing system 450 can also include a user interface service 454 configured to present metrics, video, pictures, sounds reported from the autonomous vehicle 402 to an operator of remote computing system 450. User interface service 454 can further receive input instructions from an operator that can be sent to the autonomous vehicle 402.

The remote computing system 450 can also include an instruction service 456 for sending instructions regarding the operation of the autonomous vehicle 402. For example, in response to an output of the analysis service 452 or user interface service 454, instructions service 456 can prepare instructions to one or more services of the autonomous vehicle 402 or a co-pilot or passenger of the autonomous vehicle 402.

The remote computing system 450 can also include a rideshare service 458 configured to interact with ridesharing application 470 operating on (potential) passenger computing devices. The rideshare service 458 can receive requests to be picked up or dropped off from passenger ridesharing app 470 and can dispatch autonomous vehicle 402 for the trip. The rideshare service 458 can also act as an intermediary between the ridesharing app 470 and the autonomous vehicle wherein a passenger might provide instructions to the autonomous vehicle 402 to go around an obstacle, change routes, honk the horn, etc.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 5:
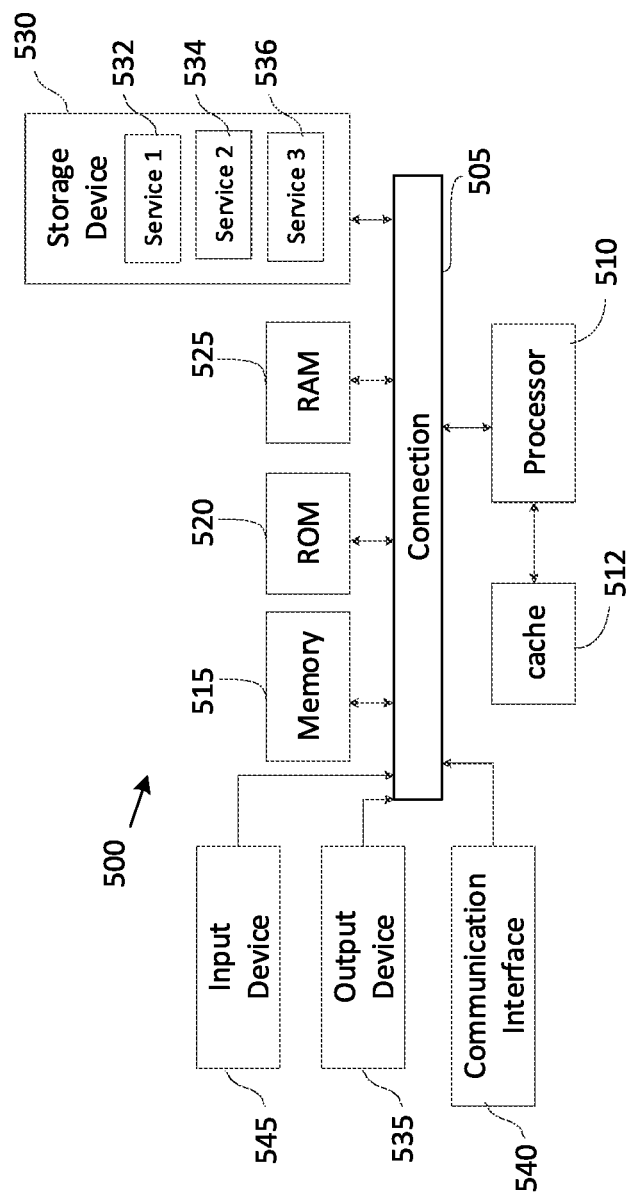
FIG. 5 illustrates an example processor-based system with which some aspects of the subject technology can be implemented.

FIG. 5 shows an example of computing system 500, which can be for example any computing device making up internal computing system 410, remote computing system 450, (potential) passenger device executing rideshare app 470, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510.

Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method, comprising:
receiving an image data collected from a camera sensor, the image data comprising an image object comprised of a plurality of image pixels;
calculating a number of image pixels corresponding with the image object;
calculating a percentage of the plurality of image pixels that correspond with the image object;
receiving Light Detection and Ranging (LiDAR) point cloud data collected from a LiDAR sensor, the point cloud data comprising a plurality of LiDAR data points corresponding with the image data collected from the camera sensor;
calculating a number of LiDAR data points corresponding with the image object
calculating a percentage of the LiDAR data points that correspond with the image object; and
determining if the camera sensor is aligned with the LiDAR sensor based on the percentage of the plurality of image pixels that correspond with the image object and the percentage of the LiDAR data points that correspond with the image object, wherein the camera sensor and the LiDAR sensor is determined to not be aligned when the percentage of the plurality of image pixels that correspond with the image object and the percentage of the LiDAR data points that correspond with the image object deviate beyond a threshold value.

2. The computer-implemented method of claim 1, further comprising:

determining if the camera sensor is aligned with the LiDAR sensor based on the number of image pixels corresponding with the image object, and the number of LiDAR data points corresponding with the image object.

3. The computer-implemented method of claim 1, wherein the image data is collected in real-time, and wherein the camera sensor is mounted to an autonomous vehicle (AV).

4. The computer-implemented method of claim 1, wherein the LiDAR point cloud data is collected in real-time, and wherein the LiDAR sensor is mounted to an autonomous vehicle (AV).

5. The computer-implemented method of claim 1, wherein the image data is received from an image database.

6. The computer-implemented method of claim 1, wherein the LiDAR point cloud data is received from a LiDAR database.

7. A system, comprising:
one or more processors; and
a computer-readable medium comprising instructions stored therein, which when executed by the processors, cause the processors to perform operations comprising:
receiving an image data collected from a camera sensor, the image data comprising an image object comprised of a plurality of image pixels;
calculating a number of image pixels corresponding with the image object;
calculating a percentage of the plurality of image pixels that correspond with the image object;
receiving Light Detection and Ranging (LiDAR) point cloud data collected from a LiDAR sensor, the point cloud data comprising a plurality of LiDAR data points corresponding with the image data collected from the camera sensor; and
calculating a number of LiDAR data points corresponding with the image object
calculating a percentage of the LiDAR data points that correspond with the image object; and
determining if the camera sensor is aligned with the LiDAR sensor based on the percentage of the plurality of image pixels that correspond with the image object and the percentage of the LiDAR data points that correspond with the image object,
wherein the camera sensor and the LiDAR sensor is determined to not be aligned when the percentage of the plurality of image pixels that correspond with the image object and the percentage of the LiDAR data points that correspond with the image object deviate beyond a threshold value.

8. The system of claim 7, further comprising:
determining if the camera sensor is aligned with the LiDAR sensor based on the number of image pixels corresponding with the image object, and the number of LiDAR data points corresponding with the image object.

9. The system of claim 7, wherein the image data is collected in real-time, and wherein the camera sensor is mounted to an autonomous vehicle (AV).

10. The system of claim 7, wherein the LiDAR point cloud data is collected in real-time, and wherein the LiDAR sensor is mounted to an autonomous vehicle (AV).

11. The system of claim 7, wherein the image data is received from an image database.

12. The system of claim 7, wherein the LiDAR point cloud data is received from a LiDAR database.

13. A non-transitory computer-readable storage medium comprising instructions stored therein, which when executed by one or more processors cause the processors to perform operations, comprising:
receiving an image data collected from a camera sensor, the image data comprising an image object comprised of a plurality of image pixels;
calculating a number of image pixels corresponding with the image object;
calculating a percentage of the plurality of image pixels that correspond with the image object;
receiving Light Detection and Ranging (LiDAR) point cloud data collected from a LiDAR sensor, the point cloud data comprising a plurality of LiDAR data points corresponding with the image data collected from the camera sensor; and
calculating a number of LiDAR data points corresponding with the image object
calculating a percentage of the LiDAR data points that correspond with the image object; and
determining if the camera sensor is aligned with the LiDAR sensor based on the percentage of the plurality of image pixels that correspond with the image object and the percentage of the LiDAR data points that correspond with the image object,
wherein the camera sensor and the LiDAR sensor is determined to not be aligned when the percentage of the plurality of image pixels that correspond with the image object and the percentage of the LiDAR data points that correspond with the image object deviate beyond a threshold value.

14. The non-transitory computer-readable storage medium of claim 13, further comprising:
determining if the camera sensor is aligned with the LiDAR sensor based on the number of image pixels corresponding with the image object, and the number of LiDAR data points corresponding with the image object.

15. The non-transitory computer-readable storage medium of claim 13, wherein the image data is collected in real-time, and wherein the camera sensor is mounted to an autonomous vehicle (AV).

16. The non-transitory computer-readable storage medium of claim 13, wherein the LiDAR point cloud data is collected in real-time, and wherein the LiDAR sensor is mounted to an autonomous vehicle (AV).

17. The non-transitory computer-readable storage medium of claim 13, wherein the image data is received from an image database.

* * * * *